Oct. 13, 1970     H. P. O. UNGER     3,533,744
METHOD AND APPARATUS FOR PERFORMING ANALYTICAL OPERATIONS
Filed Aug. 23, 1967     7 Sheets-Sheet 2

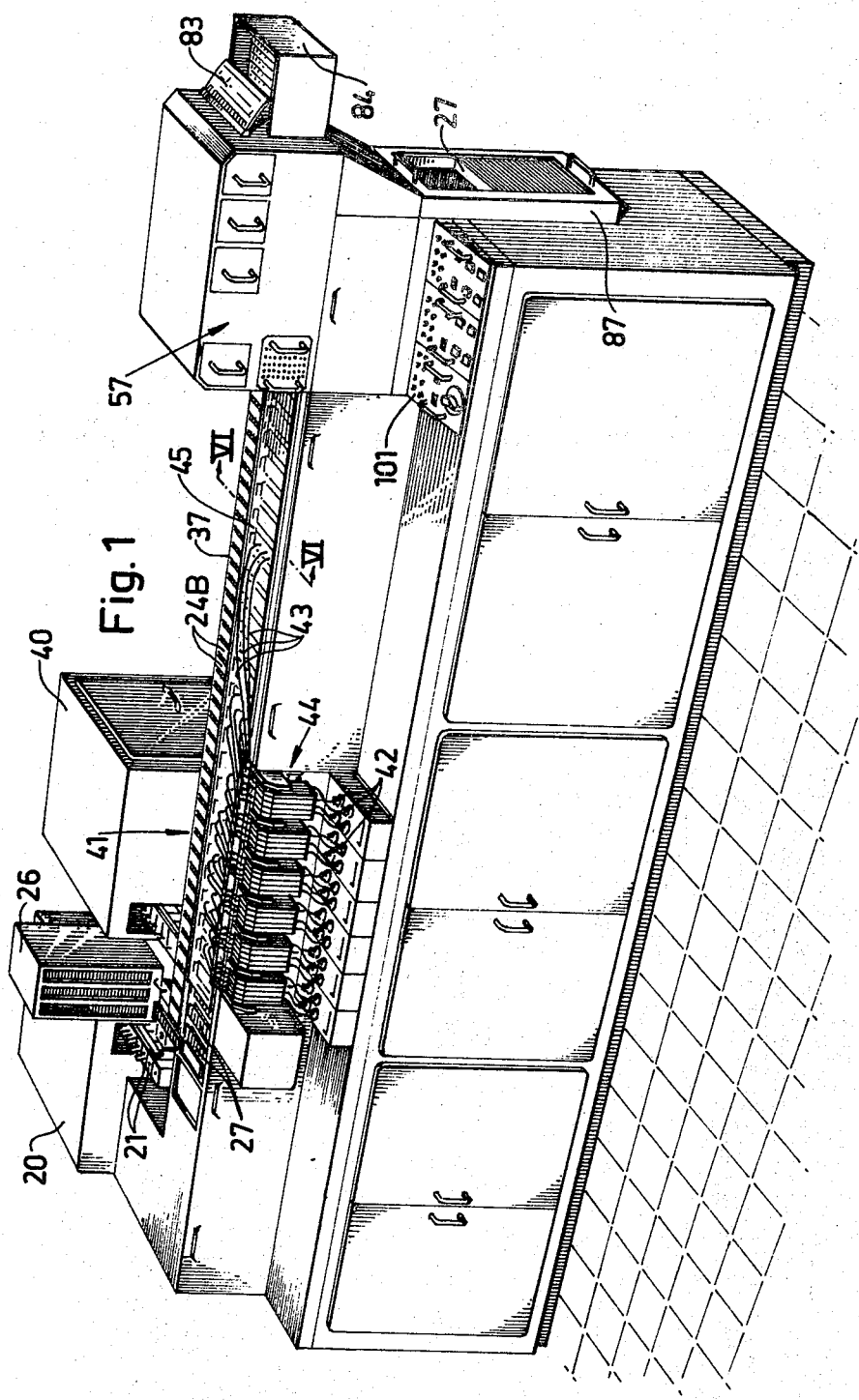

INVENTOR
Hans Peter Olof Unger

BY

ATTORNEYS

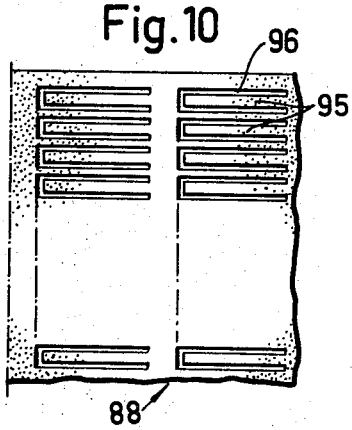
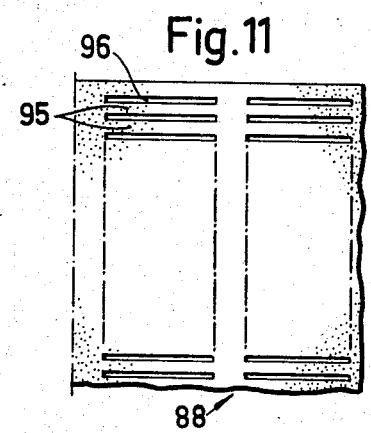
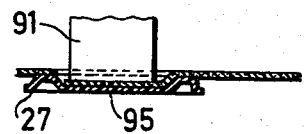
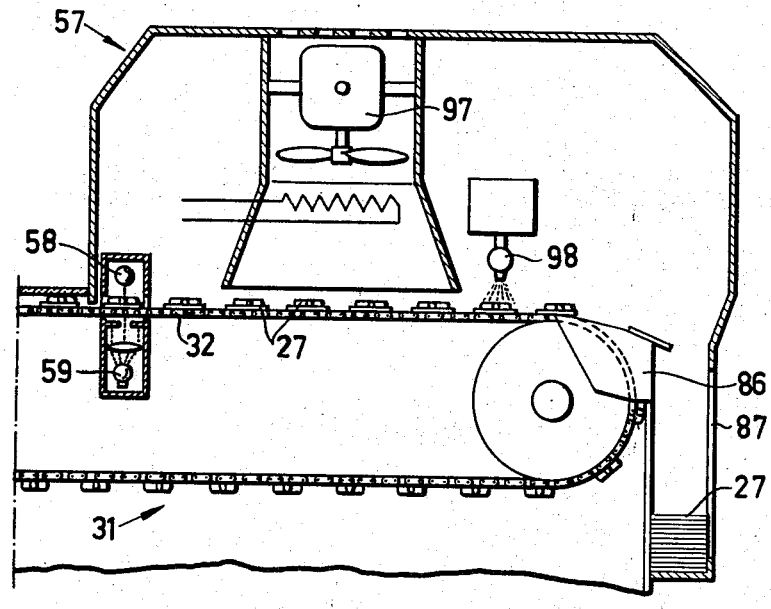

United States Patent Office 3,533,744
Patented Oct. 13, 1970

3,533,744
METHOD AND APPARATUS FOR PERFORMING
ANALYTICAL OPERATIONS
Hans Peter Olof Unger, Skeppargatan 57,
Stockholm, Sweden
Filed Aug. 23, 1967, Ser. No. 662,728
Claims priority, application Sweden, Aug. 23, 1966,
11,373/66
Int. Cl. G01n 33/16, 1/10, 1/18
U.S. Cl. 23—230                                31 Claims

ABSTRACT OF THE DISCLOSURE

A method and apparatus for automatically analyzing blood or other liquid samples wherein fractions of each sample are dispensed to separate receptacles in a sample carrier which is then transported on a conveyor to a reagent adding station, in which reagents are added to the sample fractions, and to a reading station, in which the results of the reactions in all sample fractions are simultaneously determined and/or recorded, e.g. by photometrical methods and/or photographing, without removing the sample fractions from their receptacles.

---

The present invention relates to automated analysis and more particularly to a new method and apparatus for automatically performing analytical operations on liquid samples. Although not limited thereto, the invention is primarily concerned with serological analysis, such as blood typing, determination of the osmotic fragility of red blood cells, antibody titration, prothrombin tests, and crossmatching tests.

The prime object of the present invention is to provide an improved method and apparatus for performing analytical operations on liquid samples, and one specific object is to provide an improved method and apparatus permitting a reliable corresponding identification of samples and the results of analyses performed thereon.

Another specific object is to provide an improved method and apparatus wherein no transfer of the samples is required during the analyzing procedure.

A further specific object is to provide an improved method and apparatus wherein the possibility of contamination of one sample by other samples is reduced.

The increasing burden of work on many clincial laboratories has necessitated automation of routine analyses to as large extent as possible. Although several more or less automated methods and means for clinical analyses have been devised, they all suffer from drawbacks in various respects, Thus, for example, as far as known to me, there exists no automated method or apparatus which provides for a sufficiently reliable corresponding identification of samples and the results of analyses performed thereon. Such identification is extremely important in clinical analysis, such as blood typing, where a confusion of samples and the results of analyses can be fatal.

Another drawback of many known apparatus is that the samples, after reagents have been added thereto, must be transferred from one container to another for determining the results of the reactions between the samples and the reagents.

In other apparatus the samples are brought together with reagents in narrow conduits in which the resulting mixture then flows to some means for determining the reaction result. Here, there is the possibility that the resulting mixture, which can contain clots or precipitates, contaminates the interior of the conduits. Such contamination can cause false results of analyses performed on suceeding samples.

Still another drawback of most known automated methods and apparatuses is that they do not offer the desired flexibility as regards the choice of the method and means for determining and recording the results of the analyses.

In accordance with the present invention each sample to be analyzed is dispensed to sample fraction receptacles in a single sample carrier having the sample fraction receptacles arranged in a row. The sample carrier is then transported at a predetermined speed along a path of movement with the row of receptacles transverse to the path of movement. At predetermined points along the path of movement reagents are added to the sample fractions in their receptacles, and after the sample carrier has been transported along the path of movement during a predetermined time period or, in other words, has been transported a predetermined distance, the results of the reactions between the sample fractions and the reagents are read simultaneously for all sample fractions with the sample fractions remaining in their receptacles.

An important feature of the present invention is that each sample to be analyzed is dispensed to a single sample carrier even if several analyses are to be performed on the sample, as is usually necessary, and that the sample carrier carries its sample throughout the analyzing procedure. The feature brings with it several important advantages.

Thus, for example, in conjunction with the dispensing of the sample an identification label carrying identification information corresponding to the sample can be allotted to the sample carrier and transported along with the sample carrier and then read simultaneously with the reading of the reaction result.

Another advantage is that the possibilities of faults in the reading of the reaction result connected with a transfer of the sample to a separate vessel, such as a photometer cuvette, for the reading are eliminated. The sample carrier can be of the disposable type, and since it carries the sample throughout the analyzing procedure, no problem of cleaning parts contacted by the sample or contamination of succeeding samples exist.

Moreover, the present invention permits the use of different methods and means for reading and recording the reaction result. For example, the reading can comprise photometrical determination of the optical density of the sample fractions after the reactions have been completed. Alternatively, or in addition to such photometrical determination, the sample carrier and the corresponding identification label can be photographed.

The above and other objects and advantages will be fully understood from the following description of embodiments of the invention with reference to the accompanying drawings.

FIG. 1 is a perspective view of an analytical apparatus in accordance with the invention;

FIGS. 10 and 11 are plan views of a portion of an absorbing band used in the embodiment shown in FIG. 9;

FIG. 12 is a digrammatic view in longitudinal section illustrating the operation of the embodiment shown in FIG. 9;

FIG. 13 is a view similar to FIG. 9 illustrating another alternative embodiment;

Figures 2, 14:
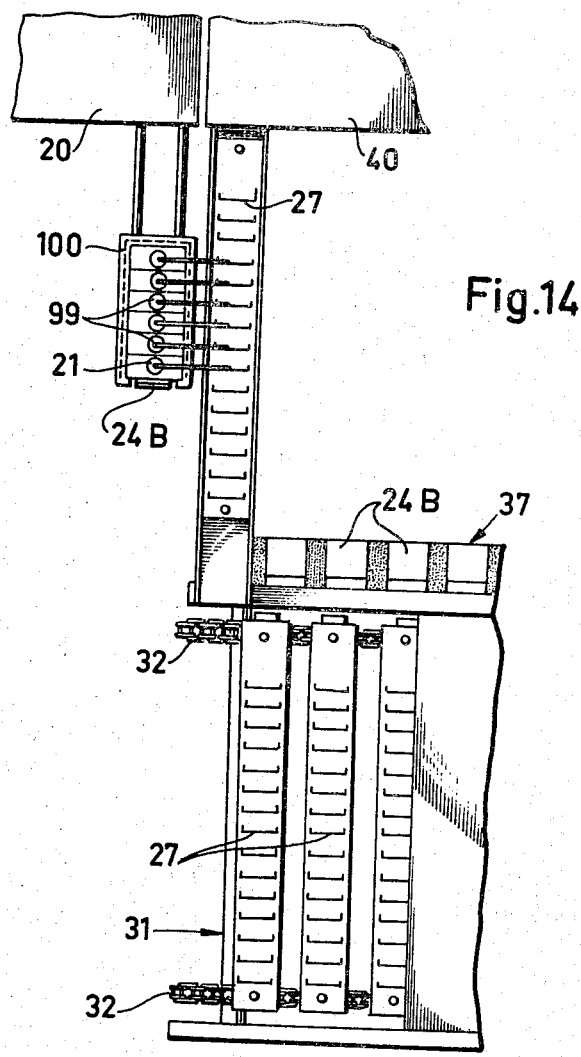
FIG. 2 is a perspective view of a preferred form of sample carrier.
FIG. 14 is a plan view of a modification of the sample dispensing station..

With reference to FIG. 1, the samples are stored in containers in a refrigerator 20. In the embodiment shown the sample containers are syringes 21, preferably of the disposable type, in which the samples are collected on taking the samples. Thus, the samples need not be transferred to a separate container. The cannula of each syringe 21 is provided with a length of flexible tubing 22, and each syringe is held in a cassete 23 for facilitating the handling. The cassete is provided with at least two identification labels 24A and 24B carrying e.g. the number of the sample and the name of the patient from which the sample is taken. The information on the labels can be fully written out and/or in the form of punched holes or equivalent.

Figure 3:
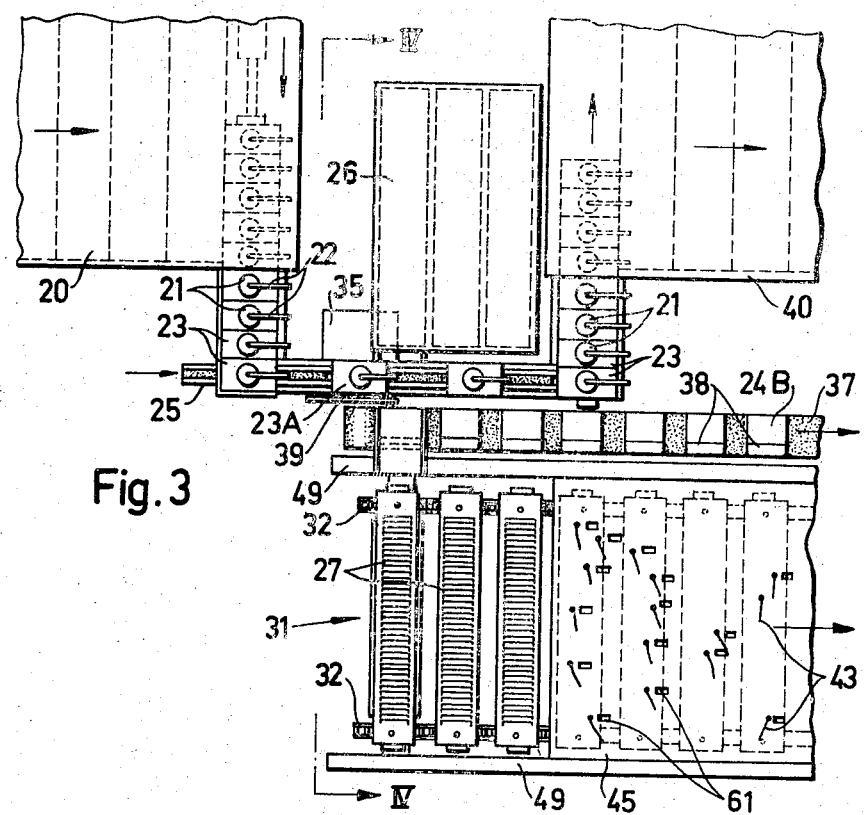
FIG. 3 is a diagrammatic plan view of the left hand portion of FIG. 1 and illustrates a sample dispensing station of the apparatus.
Figure 4:
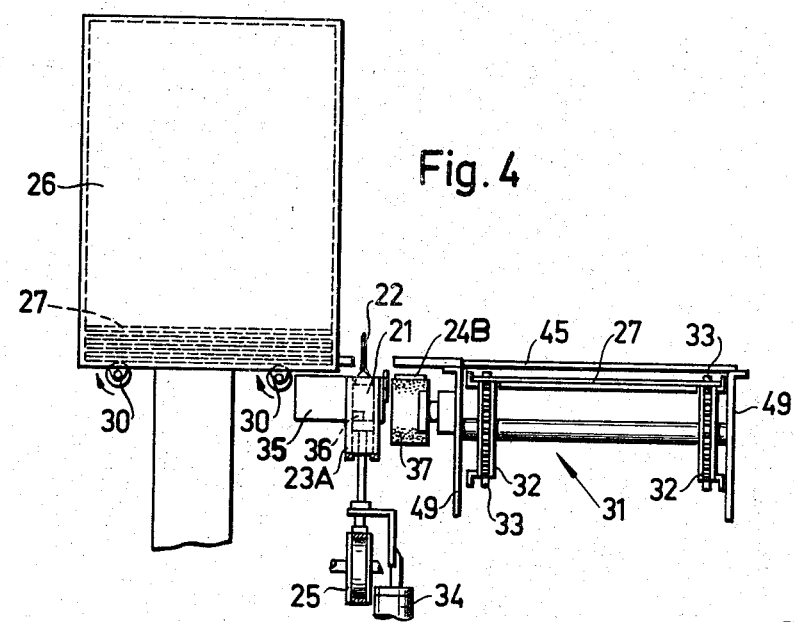
FIG. 4 is an elevational view from the line IV—IV in FIG. 3.
Figure 5:
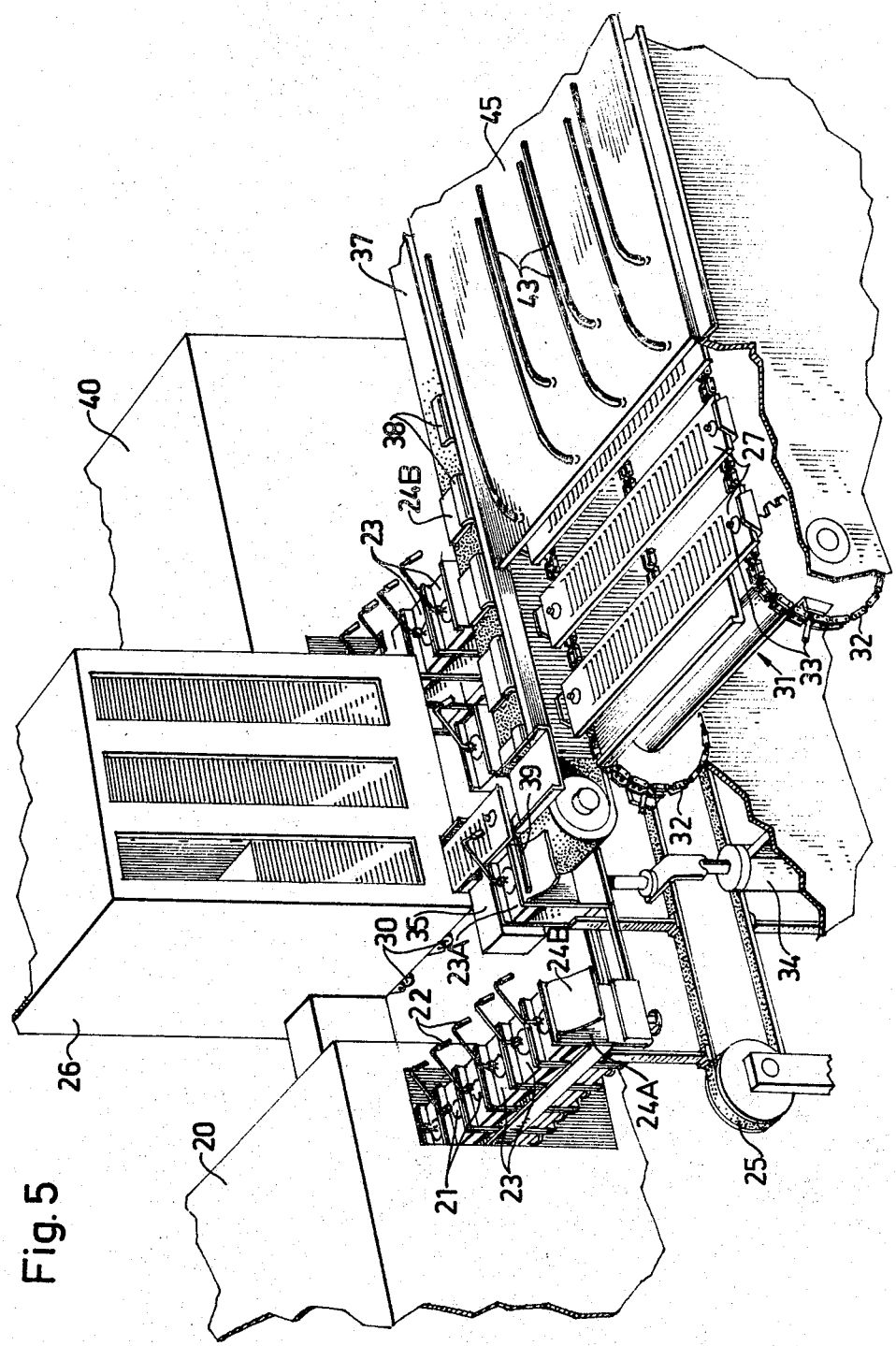
FIG. 5 is a perspective view of the sample dispensing station.

From the refrigerator 20 the cassettes 23 are fed successively by means of a feeding mechanism 25 to a dispensing position as shown at 23A adjacent a magazine 26 for sample carriers 27 (FIGS. 3, 4 and 5). The sample carriers 27 (FIG. 2) are in the form of integral rectangular slides, each having thirty elongated juxtaposed shallow receptacles 28 for receiving fractions of one single sample. For a purpose to be described each sample carrier 27 is provided with holes 29 adjacent its ends. The sample carriers are preferably of the disposable type and made of a transparent plastics material.

The magazine 26 is provided with a mechanism, parts of which are indicated at 30, for displacing one sample carrier 27 at a time out of the magazine and positioning the sample carrier on a conveyor 31. The drive (not shown) of the conveyor 31 provides an intermittent stop and go movement at a predetermined speed of two parallel, endless conveyor chains 32 which are provided with equally spaced driving pins 33. When a sample carrier 27 is positioned on the conveyor 31, the pins 33 engage the holes 29 of the sample carrier.

When a sample carrier 27 is horizontally displaced from the magazine 26, it passes below the free end of the tubing 22 attached to a syringe 21 fed to the dispensing position. During the passage the sample is continuously dispensed from the syringe 21 to the sample fraction receptacles 28 of the sample carrier. The dispensing is effected by means of an actuator 34 arranged to displace the plunger of the syringe 21 upwardly.

A complete blood type comprises analyses on blood plasma as well as on a suspension of the blood cells. Thus, if the apparatus is to be used for complete blood typing, the blood samples in the syringes 21 must initially be separated into a plasma fraction and a blood cell fraction. This separation can be accomplished by centrifuging the samples in the syringes before the syringes are put into the refrigerator 20. Alternatively, the syringes can be stored in the refrigerator 20 long enough to allow the blood cells to settle by gravity. In any case the syringes 21 will contain blood plasma in the upper portion thereof and blood cells in the lower portion. Hence, the first sample fraction receptacles 28 passing below the tubing 22 will receive plasma. When the desired number of receptacles 28 have received plasma, the displacing mechanism 30 actuates an electromagnetic stirrer 35 positioned adjacent the dispensing position 23A. The stirrer 35 then starts to agitate a magnetic member 36 in the syringe 21 to mix the blood cells with remaining plasma so that during the continued dispensing the receptacles 28 will receive a suspension of blood cells.

A conveyor band 37 intended for transporting one of the two identification labels 24A and 24B of the cassettes 23 runs in parallel with the conveyor 31 (FIGS. 1, 3, 4 and 5). The conveyor band 37 may be endless, or it may be a continuous band which is pulled off from a supply roll. When a cassette 23 reaches its dispensing position 23A and a sample carrier 27 is displaced towards the conveyor 31, one of the two identical identification labels 24A and 24B is transferred from the casette to the conveyor band 37. The labels are secured to the cassette in vertical position along their upper edges, and when the cassette approaches the dispensing position, a cam element (not shown) folds the label 24B to horiozntal position, whereupon this label is secured to the conveyor band 37, adhesively or by means of clips 38, and severed from the cassette by means of a cutter indicated at 39. The other label 24A remains on the cassette which after the sample has been dispensed is fed to a refrigerator 40. The conveyor band 37 is connected to or synchronized with the conveyor 31 to transport the label 24B side by side with the corresponding sample carrier.

After a sample carrier 27 has been positioned on the conveyor 31, the conveyor transports the sample carrier step by step to and through a reagent adding station 41 (FIG. 1) wherein the required reagents are added to the sample fractions from reagent containers 42. Each container 42 is provided with a dispensing conduit 43 passing through a pump element in a peristaltic pump assembly 44 to a socket in a horizontal, preferably transparent plate 45 overlying the conveyor 31 and the sample carriers 27 transported thereby. The position of the socket in the plate depends on the lateral position of the sample fraction receptacle for which the reagent is intended and of the required reaction time: if a long reaction time is required, the socket is positioned near the rear edge of the plate 45, that is near the left hand edge in FIG. 1, whereas if a short reaction time is required, the socket is positioned a greater distance from the rear edge of the plate. The plate 45 also serves to protect the sample carriers 27 and to reduce evaporation of the sample fractions. In order that the conduits 43 can not be inserted in wrong sockets in the plate 45, each conduit preferably is provided with a connector having a different shape for different reagent containers 42, each socket being shaped in correspondence to the proper connector.

After the reagents have been added the sample carriers 27 must often be agitated so that the sample fractions are mixed with the reagents and, moreover, the sample fractions must often be maintained at predetermined temperatures. In blood typing, for example, some sample fractions must be maintained at about +45° F., whereas others must be maintained at about +68° F. and still others at about +100° F.

In accordance with the invention the agitation is accomplished by rocking the sample carriers 27 about an axis which is transverse to the direction of movement of the conveyor 31, i.e. parallel to the row of receptacles 28 in the sample carriers. To this end the apparatus is provided with a plurality of rocking devices 46, FIG. 6, which are connected together and spaced in the direction of movement of the conveyor 31. The rocking devices 46 are positioned so that they underlie and support one sample carrier 27 each during the rest periods of the conveyor 31. Each rocking device 46 comprises a transverse bar 47 having a pair of upstanding end members 48 which are pivoted to longitudinal side members 49 of the conveyor 31 as shown at 50. The transverse bar 47 is provided with a depending lever 51 pivoted to a connecting bar 52 which is common to all rocking devices 46 and reciprocated longitudinally of the conveyor by a suitable drive (not shown).

Figure 6:
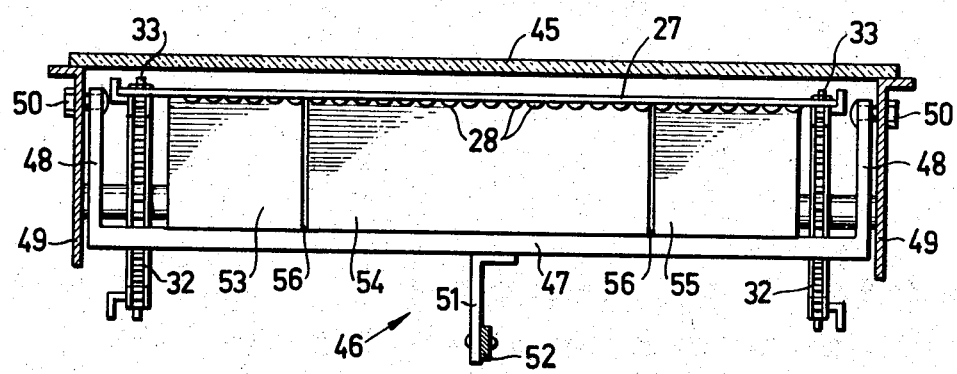
FIG. 6 is a diagrammatic view in cross section taken on the line VI—VI in FIG. 1.

The transverse bar 47 carries three temperature control blocks 53, 54 and 55 of aluminum, for example, which are adapted to engage the underside of the sample carrier 27 as shown in FIG. 6. Assuming that the apparatus is to be used for blood typing, the block 53 is maintained at about +40° F., whereas the block 54 is maintained at about +100° F. and the block 55 is maintained at about +68° F. The blocks 53 of all rocking devices 46 may be provided with passages (not shown) through which water at +40° F. is passed, the passages of the blocks being connected together and to a water cooler by means of flexible tubing (not shown). The blocks 54 may be provided with electric heaters (not shown) and insulating elements 56, whereas the blocks 55 may be provided with heating or cooling elements, depending on the ambient temperature. If the reaction temperature of the sample fractions overlying the blocks 55 is not critical, these blocks need not be provided with temperature control means.

The holes 29 of the sample carriers 27 are suitably slightly oversized so that when the transverse bars 47 with the blocks 53, 54 and 55 carried thereon are rocked about the pivots 50, the sample carriers 27 are rocked about transverse axes passing through the holes 29 and the pins 33 of the conveyor chains 32.

Figure 7:
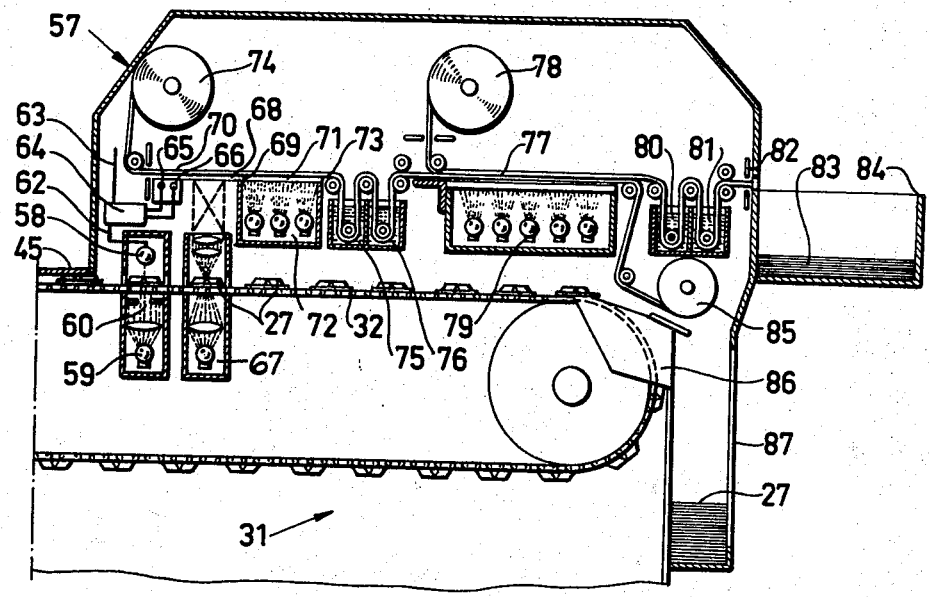
FIG. 7 is a diagrammatic view in longitudinal section of the reading station.

From the reagent adding station 41 the sample carriers 27 are transported in succession to a reading station generally designated 57. In the embodiment shown in FIG. 7 the reading station 57 comprises means for photometrically determining the optical density of the sample fractions and means for photographing each sample carrier 27 together with the corresponding identification label 24B.

The photometrical determination of the optical density is accomplished by means of a plurality of photoelectric cells 58, one for each sample fraction receptacle 28, arranged in a row extending transversely of the direction of movement of the conveyor 31. The row of photoelectric cells 58 is positioned above the path of movement of the sample carriers 27 which are illuminated from below by a light source 59, preferably a monochromatic one. The sample fractions in the sample carriers transmit light in dependence of their optical densities, that is in dependence of agglutination, precipitation or equivalent caused by the reagents, and thus the photoelectric cells 58 are energized in dependence of the optical densities of the sample fractions. The determination may take place while the sample carriers are stationary, each sample fraction receptacle 28 then being illuminated over its entire surface. Alternatively, the determination can take place while the sample carriers are moving at a constant speed with respect to the photoelectric cells 58 and the light source. In this case each sample fraction receptacle 28 is illuminated through a very narrow transverse slit, as shown at 60 in FIG. 7, so that the sample fractions are scanned by a very thin transverse band of light during the movement of the sample carriers. This scanning permits a more accurate determination of the optical density as is briefly explained below. If, for example, a sample fraction receptacle 28 is contaminated, the determination of the optical density may show a too high optical density of the sample fraction if the first-mentioned method of determination is used. Howveer, if the sample fraction is scanned by a very thin band of light as described above, the corresponding photoelectric cell 58 will respond to individual cells or cell agglutinates and give a fluctuating output. The fluctuation can be used to determine whether the result is false or true. For a more detailed explanation reference is made to my copending patent application No. 479,186, filed on Aug. 12, 1965.

A more accurate determination of the results of reactions between the sample fractions and the reagents can be obtained if the optical density of each sample fraction is determined not only after the reaction has taken place but also immediately after the addition of the reagent and the difference between the two values of the optical density so obtained is determined. To this end photoelectric cells and light sources corresponding to the photoelectric cells 58 and light source 59 can be positioned immediately following the points at which the reagents are added to the sample fractions as indicated at 61 in FIG. 3. The outputs of each pair of corresponding photoelectric cells 58 and 61 are connected through leads 62 and 63 to a memory and discriminator circuit which is represented by a block 64 in FIG. 7 and in which the difference between the two values of the optical density is determined.

The result of thte determination of the optical density of the sample fractions can be displayed and/or recorded in any suitable way, e.g. by means of one or more multichannel pen recorders. In the embodiment shown in FIG. 7 the result is displayed by means of two parallel and contiguous rows of indicator lamps 65 and 66. Each row comprises one lamp 65 and 66, respectively, for each photoelectric cell 58. The lamps 65 and 66 are connected to the outputs of the circuit 64 which is adapted to energize either or both of the lamps in dependence of the optical density of the corresponding sample fraction: if the optical density is clearly above a predetermined value, the lamp 65 is energized, whereas if the optical density is clearly below the predetermined value, the lamp 66 is energized, and if the optical density is within a region over and below the predetermined value, both lamps 65 and 66 are energized. The outputs of the circuit 64 may also be connected to a tape punch (not shown) or equivalent, the punched tape being used for processing the results of the analyses by means of a computer. The identification label 24B then carries information about the sample in the form of punched holes or equivalent and the reading station is provided with means for reading this information and transferring it to the tape punch.

Figure 8:
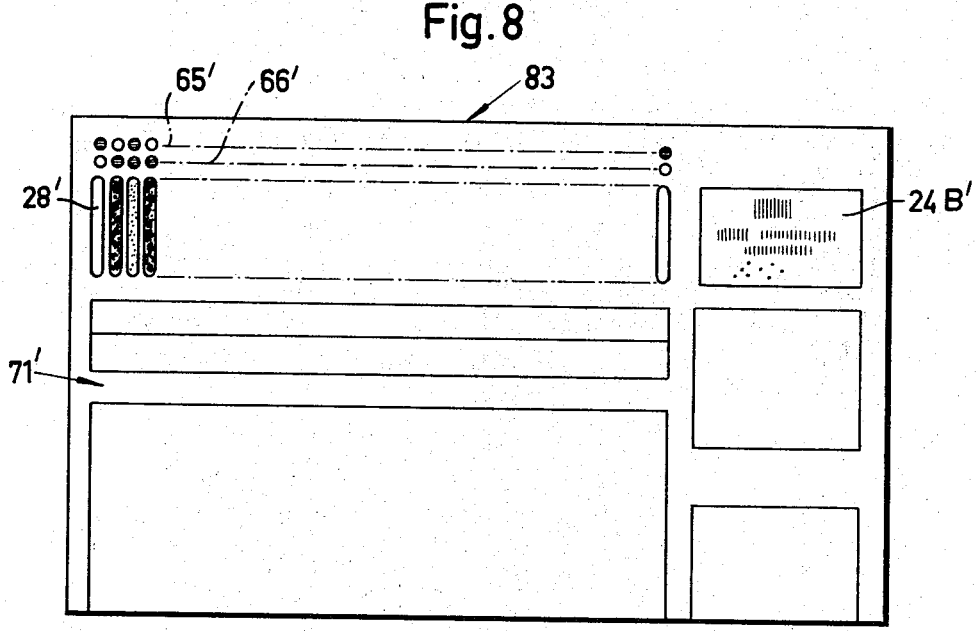
FIG. 8 is a plan view of a document obtained in the reading station.

Immediately after the determination of the optical density each sample carrier 27 and the corresponding identification label 24B are photographed. To this end the sample carrier and the label are illuminated from below by light from a light box 67. The light transmitted through the sample carrier 27 and the label 24B is projected on an area 68 of a translucent plate 69. Another area 70 of the plate 69 adjacent the area 68 overlies the two rows of indicator lamps 65 and 66, and still another area 71 adjacent the area 69 is provided with a pattern of light-absorbing lines and legends corresponding to a patient card or equivalent and overlies a light box 72. A photosensitive paper or film 73 is intermittently, viz. in synchronism with the movements of the conveyor 31, pulled off from a supply roll 74 and caused to engage the plate 69. Thus, for each movement of the conveyor 31 an image of the rows of lamps 65 and 66, one sample carrier 27, the corresponding label 24B, and the pattern in the area 71 is exposed on the photosensitive paper 73. After the exposure the paper on film 73 is passed through developing and fixing baths 75 and 76 and then, in engagement with a second photosensitive paper or film 77 pulled off from a supply roll 78, pulled over a light box 79. Thus, the developed and fixed negative image on the first paper or film 73 is exposed on the second paper or film 77 which is then passed through developing and fixing baths 80 and 81 and finally cut in lengths by a cutter 82 to form patient cards 83 and stacked in a bin 84. The negative paper or film 73 is reeled as shown at 85. FIG. 8 shows the patient card 83, carrying the positive images 65' and 66' of the lamps 65 and 66', the positive image 28' of the sample fraction containers 28, the positive image 24B' of the identification label 24B, and the positive image 71' of the pattern in the area 71 of the plate 69. The fields provided by the image 71' can be used e.g. for commenting on the results of the analyses. The images 65' and 66' and 24B' can be used instead of a punched tape for a subsequent processing of the results of the analyses by means of a computer. If desired, the results of the analyses can be evaluated ocularly from the image 28'; the photoelectric cells 58 can then be dispensed with.

From the reading station 57 the sample carriers 27 are transported to a removing device 86 and collected in a bin 87.

Figure 9:
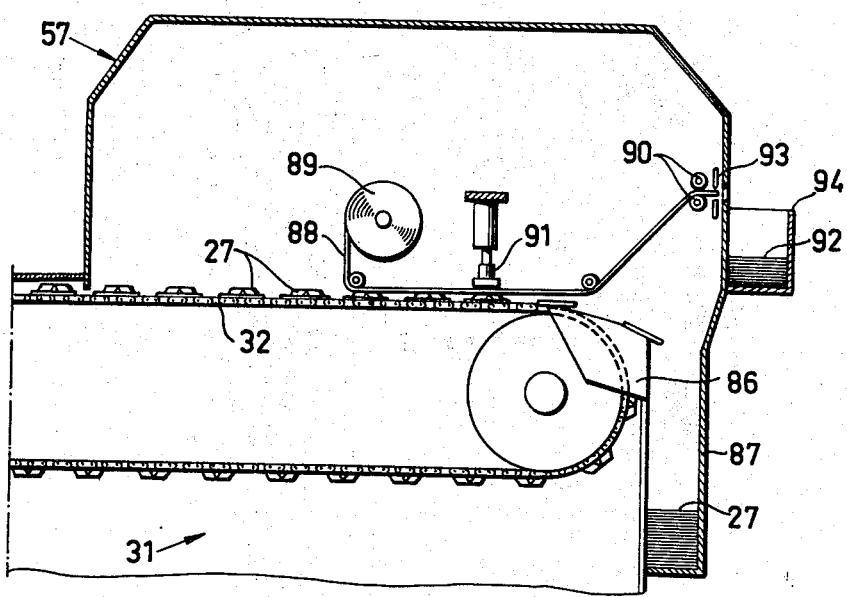
FIG. 9 is a view similar to FIG. 7 illustrating an alternative embodiment for recording the results of the analyses.

As an alternative, or in addition to the photographing, the contents of the sample fraction receptacles can be taken up onto an absorbing member as diagrammatically illustrated in FIG. 9. A band 88 of absorbing material and having a width not less than the length of the sample carriers 27, is pulled off from a supply roll 89 in synchronism with the movements of the conveyor 31 by means of driven rolls 90 and passed above the sample carriers 27 adjacent the end of the conveyor 31. A punch 91 is arranged to depress portions of the band 88 into the sampled fraction receptacles to cause the sample fractions to be absorbed into the band. The band 88 is then cut to strips 92, each corresponding to one sample carrier 27, by means of a cutter 93 and collected in a bin 94. If desired, the strips 92 can be used for evaluating the results of the reactions of the sample fractions. FIGS. 10 and 11 show two embodiments of the band 88. In FIG. 10 the band 88 is provided with a plurality of tongues 95, one for each sample fraction receptacle 28, which are separated from the body of the band on three sides by a slit 96. In operation the punch 91 depresses the tongues 95 into the sample fraction receptacles of the sample carrier 27, as shown in FIG. 12, to cause the tongues to engage the bottoms of the receptacles and absorb the sample fractions therein. The slits 96 prevent the absorbed sample fractions from spreading from the tongues 95. The embodiment shown in FIG. 11 differs from that shown in FIG. 10 only in that the tongues 95 are separated from the body of the band 88 on two sides only.

FIG. 13 shows another alternative embodiment of the reading station 57. In this embodiment the sample fractions are dried in their receptacles and then fixed by applying a suitable fixative. The drying is accomplished by means of a fan 97 which delivers heated air to the sample fractions. The fixative is applied from a spray applicator 98.

FIG. 14 is a plan view of the sample dispensing station adapted for complete crossmatching patient blood samples with five donor blood samples in three environments. Thus, each patient blood sample is to be crossmatched with three fractions of each donor blood sample. To these three fractions auxiliary reagents, viz. saline for the first fraction, an albumin preparation for the second fraction and an enzyme preparation for the third fraction, are added in the reagent adding station 41 (FIG. 1).

The container or syringe 21 holding the patient blood sample is joined together with the five containers or syringes 99 holding the donor blood samples in a cassette 100 which is then sealed by suitable means. The sample carrier is displaced from the magazine in three steps, the length of each step corresponding to the length of the assembly of containers 21 and 99. The fractions of the patient blood sample are continuously dispensed while the sample carrier 27 is moving, whereas the three fractions of the donor blood samples are dispensed during three rest periods of the sample carrier. During the first rest period the identification label 24B of the patient blood sample syringe 21 is severed and transferred to the conveyor belt 37 as described before.

The means for controlling the operation of the apparatus forms no part of the present invention and need, therefore, not be described in detail. It should be sufficient to note that the apparatus is provided with fractions from spreading from the tongues 95. The embodiment shown in FIG. 11 differs from that shown in FIG. 10 only in that the tongues 95 are separated from the body of the band 88 on two sides only.

FIG. 13 shows another alternative embodiment of the reading station 57. In this embodiment the sample fractions are dried in their receptacles and then fixed by applying a suitable fixative. The drying is accomplished by means of a fan 97 which delivers heated air to the sample fractions. The fixative is applied from a spray applicator 98.

FIG. 14 is a plan view of the sample dispensing station adated for complete crossmatching patient blood samples with five donor blood sampels in three environments. Thus, each patient blood sample is to be crossmatched with three fractions of each donor blood sample. To these three fractions auxiliary reagents, viz saline for the first fraction, an albumin preparation for the second fraction and an enzyme preparation for the third fraction, are added in the reagent adding station 41 (FIG. 1).

The container of syringe 21 holding the patient blood sample is joined together with the five containers or syringes 99 holding the donor blood samples in a cassette 100 which is then sealed by suitable means. The sample carrier is displaced from the magazine in three steps, the length of each step corresponding to the length of the assembly of containers 21 and 99. The fractions of the patient blood sample are continuously dispensed while the sample carrier 27 is moving, whereas the three fractions of the donor blood samples are dispensed during three rest periods of the sample carrier. During the first rest period the identification label 24B of the patient blood sample syringe 21 is severed and transferred to the conveyor belt 37 as described before.

The means for controlling the operation of the apparatus forms no part of the present invention and need, therefore, not be described in detail. It should be sufficient to note that the apparatus is provided with a control panel 101 (FIG. 1) from which the control means can be set manually.

It will be understood that the invention may be embodied otherwise than as herein specifically illustrated or described and that certain changes in the form and arrangement of parts may be made within the scope of the appended claims. For example, the identification label removed from the sample containers may be attached directly to the sample carriers instead of being attached to a separate conveyor belt. Furthermore, the photographing can be accomplished by means of a more or less conventional camera which operates in synchronism with the movements of the conveyor.

What I claim is:

1. A method of automatically performing analytical operations on liquid samples, comprising the steps of dispensing fractions of each sample to a row of sample fraction receptacles in a single sample carrier, transporting said sample carrier containing said sample fractions in said receptacles at a predetermined speed along a path of movement with said row of receptacles transverse to said path of movement, adding reagents to the sample fractions in their receptacles at predetermined points along said path of movement and, after said sample fractions and added reagents have been transported along said path of movement during a predetermined time period, simultaneously reading the reaction result in all sample fractions at the end of said predetermined period without removing the sample fractions from their receptacles.

2. A method as claimed in claim 1 wherein said step of dispensing the sample fractions is accomplished from a stationary container for the sample as said sample carrier is horizontally moved on to a conveyor in a direction transverse to said path of movement.

3. A method as claimed in claim 1 including the step of rocking said sample carrier during the transport thereof along said path of movement after said adding of reagents and prior to said reading, whereby the sample fractions and the reagents are mixed.

4. A method as claimed in claim 1 wherein said step of reading the reaction result includes photometrical determination of the optical density of each sample fraction after said predetermined time period.

5. A method as claimed in claim 4 wherein said photometrical determination includes passing a thin band of light in a plane transverse to said path of movement through each sample fraction while said sample carrier is continuously moving along said path of movement with respect to said band of light.

6. A method as claimed in claim 1 wherein said step of reading the reaction result includes photometrical determination of the optical density of each sample fraction immediately after said adding of reagents and after said predetermined time period, and determination of the difference between the two values of the optical density so obtained.

7. A method as claimed in claim 1 wherein said step of reading the reaction result includes simultaneous photographing of all sample fractions in their receptacles after said predetermined time period.

8. A method as claimed in claim 7 wherein said photographing includes passing light through the sample fractions to a photosensitive paper or film.

9. A method as claimed in claim 1 wherein said step of reading the reaction result includes drying and fixing said sample fractions in their receptacles.

10. A method as claimed in claim 1 wherein said step of reading the reaction result includes taking up each sample fraction from its receptacle onto an absorbing member.

11. A method as claimed in claim 1 including the steps of allotting, in conjunction with said dispensing of the sample fractions, to said sample carrier an identification label carrying identification information corresponding to the sample from which the sample fractions are dispensed, and reading said identification information simultaneously with said reading of the reaction result.

12. A method as claimed in claim 11 wherein said step of allotting an identification label to said sample carrier includes removal of an identification label from a container containing the sample and wherein said identification label is transported along with said sample carrier until said identification information has been read.

13. A method as claimed in claim 12 wherein said identification label is positioned on a conveyor and transported side by side with said sample carrier along said path of movement.

14. A method as claimed in claim 11 wherein said steps of reading the reaction result and reading said identification information include simultaneous photographing of all sample fractions in their receptacles and said identification label.

15. A method as claimed in claim 1 for crossmatching patient blood samples with each of a plurality of donor bloods, including the steps of joining together in a cassette a first container holding a patient blood sample and a plurality of second containers, each holding a sample of one donor blood, sealing the cassette, and dispensing blood from said second container to separate receptacles of said row of receptacles in conjunction with said dispensing of fractions of the patient blood sample.

16. A method as claimed in claim 15 wherein said step of dispensing blood from said second containers is accomplished by dispensing a fraction of blood from each of said second containers to each of three of said receptacles, and wherein three auxiliary reagents are dispensed to one receptacle each of said three receptacles.

17. A method as claimed in claim 15 including the steps of allotting, in conjunction with said dispensing of fractions of the patient blood sample, in conjunction with said dispensing of the sample fractions, to said sample carrier an identification label carrying identification information corresponding to the sample from which the sample fractions are dispensed, and reading said identification information simultaneously with said reading of the reaction result.

18. A method as claimed in claim 17 wherein said steps of reading the reaction result and reading said identification information includes simultaneous photographing of all sample fractions in their receptacles and said identification label.

19. An apparatus for automatically performing analytical operations on liquid samples, comprising a plurality of sample carriers, each sample carrier having a row of receptacles for receiving fractions of a sample, a conveyor for transporting said sample carriers in succession along a path of movement with said row of receptacles transverse to said path of movement, means for dispensing fractions of said sample to the receptacles in each of said rows of receptacles, means for adding reagents to the sample fractions in the receptacles in said row at predetermined points along said path of movement, and means for simultaneously reading the reaction result in all sample fractions while the sample fractions are in their receptacles and prior to removing said receptacles from said conveyor.

20. An apparatus as claimed in claim 19 including means for transporting side by side with said sample carriers along said path of movement an identification label carrying identification information corresponding to a sample from which the sample fractions are dispensed, and means for reading said information simultaneously with said reading of the reaction result.

21. An apparatus as claimed in claim 19 wherein said means for reading the reaction result comprises a light source for passing light through the sample fractions in their receptacles and a plurality of photoelectric cells, one for each receptacle, arranged in a row extending transversely to said path of movement, each photoelectric cell being positioned to receive light transmitted through the sample fraction in the corresponding receptacle.

22. An apparatus as claimed in claim 21 wherein said light source is provided with a narrow slit extending transversely of said path of movement to pass via said slit a thin band of light through each sample fraction and wherein said conveyor is adapted to transport each sample carrier in a continuous movement past said band of light.

23. An apparatus as claimed in claim 20 wherein said means for reading the reaction result and said means for reading said information include means for projecting on a first area of one side of a translucent plate an image of the sample fractions and said identification label, and means for holding a first photosensitive paper or film in engagement with the opposite side of said plate, whereby said image is exposed on said paper or film.

24. An apparatus as claimed in claim 23 wherein a second area of said plate adjacent said first area is provided with a pattern of non-translucent lines and wherein means are provided for illuminating said second area of said plate from said first side thereof, whereby an image of said pattern is exposed on said photosensitive paper or film.

25. An apparatus as claimed in claim 23 wherein said means for reading the reaction result comprises a light source for passing light through the sample fractions in their receptacles, a plurality of photoelectric cells, one for each receptacle, arranged in a row extending transversely to said path of movement, each photoelectric cell being positioned to receive light transmitted through the sample fraction in the corresponding receptacle, two parallel, contiguous rows of indicator lamps, said rows of lamps comprising one lamp each for each photoelectric cell and being positioned adjacent said first area of said plate on said first side thereof, and discriminator circuitry connected between the output of each photoelectric cell and the two corresponding indicator lamps to energize either one or both of said two indicator lamps in dependence of the reaction result in the corresponding sample fraction.

26. An apparatus as claimed in claim 23 including means for developing and fixing said image exposed on said first photosensitive paper or film, means for exposing the developed and fixed image on a second photosensitive paper or film, and means for developing and fixing said image exposed on said second photosensitive paper or film.

27. An apparatus as claimed in claim 19 including a plate overlying said conveyor and provided with sockets for receiving connecting members of tubing for supplying said reagents to the sample fractions in said receptacles.

28. An apparatus as claimed in claim 19 including an electromagnetic device for agitating a magnetic stirring member in a sample container from which the sample fractions are dispensed.

29. An appaartus as claimed in claim 19 including means associated with said conveyor and arranged to rock each sample carrier about an axis which is parallel to said row of receptacles.

30. An apparatus as claimed in claim 29 wherein said rocking means includes means for controlling the temperature of the sample fractions during and transport of said sample carriers.

31. An apparatus as claimed in claim 19 wherein each sample carrier is formed by a substantially rectangular slide for transparent material, said receptacles being formed by shallow elongated, juxtaposed depressions in said plate.

References Cited

UNITED STATES PATENTS

| | | | |
|---|---|---|---|
| 3,168,124 | 2/1965 | Lenkey | 23—253 XR |
| 3,239,312 | 3/1966 | Bell et al. | 23—253 |
| 3,266,298 | 8/1966 | Whitehead et al. | 23—253 XR |
| 3,327,535 | 6/1967 | Sequeira | 23—259 XR |
| 3,390,962 | 7/1968 | Goldsmith | 23—253 |
| 3,415,627 | 12/1968 | Rait | 23—253 |

MORRIS O. WOLK, Primary Examiner

R. E. SERWIN, Assistant Examiner

U.S. Cl. X.R.

23—253, 259; 356—39, 246

UNITED STATES PATENT OFFICE
CERTIFICATE OF CORRECTION

Patent No. 3,533,744　　　　　Dated October 13, 1970

Inventor(s) H.P.O. Unger

It is certified that error appears in the above-identified patent and that said Letters Patent are hereby corrected as shown below:

Col. 1, line 51, change the first comma to a period;

Col. 2, line 22, change "the" to --this--;

Col. 3, line 1, correct the spelling of "diagrammatic"; in each of lines 15 and 16 correct the spelling of "cassette"; line 51 change "type" to --typing--;

Col. 4, line 5, correct the spelling of "cassette";

Col. 5, line 54, correct the spelling of "However";

Col. 6, line 47, change "on" to --or--;

Col. 7, line 8, change "sampled" to --sample--;

Claim 18, line 3, correct the spelling of "include";

Claim 29, line 1, correct the spelling of "apparatus"; and

Claim 30, line 3, change "and" to --said--.

Signed and sealed this 31st day of August 1971.

(SEAL)
Attest:

EDWARD M. FLETCHER, JR.　　　　ROBERT GOTTSCHALK
Attesting Officer　　　　　　　　Acting Commissioner of Patents